March 3, 1964 H. N. HALL Re. 25,528

TUYERE BLOCK AND REINFORCING INSERT THEREFOR

Original Filed June 28, 1960 3 Sheets-Sheet 1

INVENTOR
Horace N. Hall

BY Arthur Middleton

ATTORNEY

TUYERE BLOCK AND REINFORCING INSERT THEREFOR

Original Filed June 28, 1960 3 Sheets-Sheet 2

INVENTOR

Horace N. Hall

BY Ailen Whitelock

ATTORNEY

TUYERE BLOCK AND REINFORCING INSERT THEREFOR

Original Filed June 28, 1960 3 Sheets-Sheet 3

INVENTOR
Horace N. Hall

BY Arthur Middleton

ATTORNEY

United States Patent Office

Re. 25,528
Reissued Mar. 3, 1964

25,528

TUYERE BLOCK AND REINFORCING INSERT THEREFOR

Horace N. Hall, Collegeville, Pa., assignor to E. J. Lavino and Company, Philadelphia, Pa., a corporation of Delaware Original No. 3,088,725, dated May 7, 1963, Ser. No. 39,293, June 28, 1960. Application for reissue June 11, 1963, Ser. No. 288,586
6 Claims. (Cl. 266—41)

Matter enclosed in heavy brackets [ ] appears in the original patent but forms no part of this reissue specification; matter printed in italics indicates the additions made by reissue.

This invention relates to tuyere constructions and more particularly to improvements in the tuyere blocks used therein by means of which an improved sealing of the tuyere is effected and by which the construction, erection and reinforcement as well as the maintenance of the tuyere block is expedited and wherein the assembly is characterized by its longevity in service.

Ordinarily tuyeres have been constructed by either providing a passage through the material of the block for the reception of a pipe by means of which air or other gases are injected into molten metal baths in order to purify or otherwise treat the metal being processed, or by providing an assemblage of blocks with cooperating arcuate portions which upon assembly mutually cooperate to form a passageway or the like for the reception of the pipe. In each instance, the manufacturing tolerances are such that the pipe when inserted into the block is loosely fitted therein and it is therefore necessary to pack the joints between the pipes and the bricks with fire clay or other suitable material in order to effect a proper seal. Additionally in connection with construction of this nature there is usually little or no reinforcement of the blocks or if reinforcing elements are used they have been introduced into the block in a more or less haphazard fashion with relation to the tuyere hole and no particular efforts have been made to locate the reinforcing plates in association with the tuyere pipes in order to provide the proper reinforcement.

In this type of construction the erosive action of the process during the operation of the tuyere will eat away at the fire clay seal thereby resulting in an early loss of any effectiveness of the seal. Additionally in a multi-brick construction surrounding the tuyere pipe, each of the joints between the bricks which cooperate to form the opening for the insertion of the pipe and which necessarily has to be sealed are also subject to erosive action thereby leading ultimately to a breakdown of the entire fire clay seal. It can therefore be seen that in this type of construction frequent replacement of the pipe as well as the block or blocks is required and since this, of course, is time consuming and expensive it is desirable to have a tuyere block construction which will last as long as possible and which will at the same time furnish a substantially perfect seal.

It is therefore, of primary concern in connection with this invention to provide such a tuyere block assemblage. More specifically, it is an object of the present invention to provide an improved form of tuyere block wherein the tuyere pipe is embedded in and forms a permanent part of the tuyere block in a unique and novel manner.

Another object of the present invention is to provide an assembly as set forth in the preceding object wherein the tuyere pipe is provided with a unique disposition and formation of radially, outwardly extending fins or the like which are integrally attached thereto and wherein the tuyere pipe and fins are embedded in the material of the block and serve to reinforce the block and to securely locate and fix the tuyere pipe in a predetermined position relative to the block construction.

Still another object of this invention is to provide an improved type of tuyere block having a body of ordinary construction wherein the material thereof has embedded therein a pipe provided with projecting fins and locking tabs formed thereon embedded within the material and securely fixing the tuyere pipe relative to the block material, the pipe being provided with means whereby the external gas or air connection may be readily affected.

In summary therefore this invention relates to a tuyere block construction wherein the tuyere pipe assembly is embedded within the block and wherein the tuyere pipe assembly preferably includes outwardly extending reinforcing fins or the like so as to provide a tuyere block which is not only reinforced but additionally wherein a substantially perfect seal is formed between the pipe and the block.

As this invention may be embodied in several forms without departing from the spirit or essential characteristics thereof the present embodiment is therefore illustrative and not restricitve, and since the scope of the invention is defined by the appended claims, all changes that fall within the metes and bounds of the claims or that form their functional as well as conjointly cooperative equivalents are therefore intended to be embraced by those claims.

Figure 5:
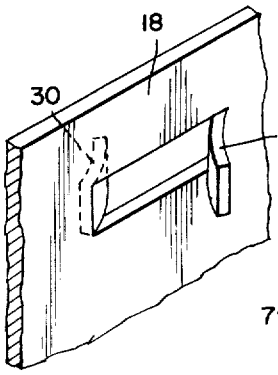
FIG. 5 is a perspective view showing a portion of one of the fins attached to the lead-in pipe and illustrating particularly the tongues struck therefrom.

Referring at this time more particularly to FIG. 1 there is shown a tuyere pipe assembly which is adapted to be used as an insert in the construction of the tuyere block and to be subsequently molded therein during the construction of the block and will be seen to consist of a tuyere pipe 10 having secured thereto a plurality of reinforcing fin members 18, 19, 22, 23, 24 and 25, each fin member extending radially outwardly and axially along substantially the entire length of the pipe 10. As can be seen the fins 18 and 19 extend substantially vertically in respect to the pipe 10 and at opposite sides thereof while the fins 22 through 25 are disposed substantially in a horizontal plane relative to the pipe 10 and also relative to the fins 18 and 19 and are preferably secured to the pipe 10 at the juncture of the pipe 10 and the fins 18 and 19 and at opposite sides of the fins 18 and 19. Each of the fin members has end edges 12, 13, 14, 15, 16 and 17 respectively and these end edges are preferably disposed slightly inwardly relative to the end face 11 of the pipe 10 and in a substantially common plane. The upper and lower fins 18 and 19 are diametrically opposed relative to the lead-in pipe 10 and extend radially therefrom, each such fin being formed of substantially a trapezoidal shape, with the outer longitudinal edges 20 and 21 thereof being disposed parallel to one another and the length of the end portion 14 of the fin 18 being substantially greater than the length of the end portion 14a of the fin 18. Correspondingly the length of the end portion 17 of the fin 19 is substantially less than the length of the end portion 17a of the fin 19. By this construction it can be seen that the tuyere insert assembly can be located within the mold and correspondingly molded within the block in an angulated position but still retaining the proper reinforcement of the block. It can be seen that the reinforcing fins will ideally radiate from the tuyere pipe 10 and will reinforce the tuyere block throughout its entire length and width. Each horizontal fin is provided with outwardly struck tongues such as the vertically upwardly extending tongues 26 on the fin 23 and the downwardly projecting tongues 27 on the fin 25. The two vertical fins 18 and 19 are provided at longitudinally spaced points therealong with laterally directed tongues extending in opposite directions from the flanges and struck from common openings, such tongues presenting oppositely and laterally projecting pairs 30 and 31. See particularly FIG. 5 for a detail view of the tongues 30 and 31. In the forms shown in FIG. 1 the end face of the lead-in pipe is provided with a pair of horizontally diametrically opposed notches 33 and 34 to receive a locating pin or rod not shown, when the insert is disposed in the mold and which serves to properly hold and locate the insert within the mold during the molding operation.

When the insert is secured within the mold, the fire clay or similar material is introduced into the mold to embed the insert therein, leaving the pipe 10 open, of course, and it will be readily apparent that the projecting fins together with their outwardly struck tongues will serve to securely lock the insert in place relative to the fire clay or brick material, the fire clay entering into the openings and binding around the struck out tongues to thereby effect a rigid and lasting integral structure in which the insert consisting of the pipe 10 and the radiating reinforcing fins form a composite structure in combination with the block itself.

As can be seen the difficulties in sealing previously encountered wherein tuyere pipes were introduced loosely through preformed apertures in a wall or in combination with apertures formed by a number of cooperating bricks is entirely eliminated inasmuch as the tuyere pipe 10 along with its reinforcing elements is integrally associated with the block and as such there is no necessity for external sealing between the pipe and the block itself. The difficulties therefore are substantially obviated and a perfect seal results.

Figure 1:
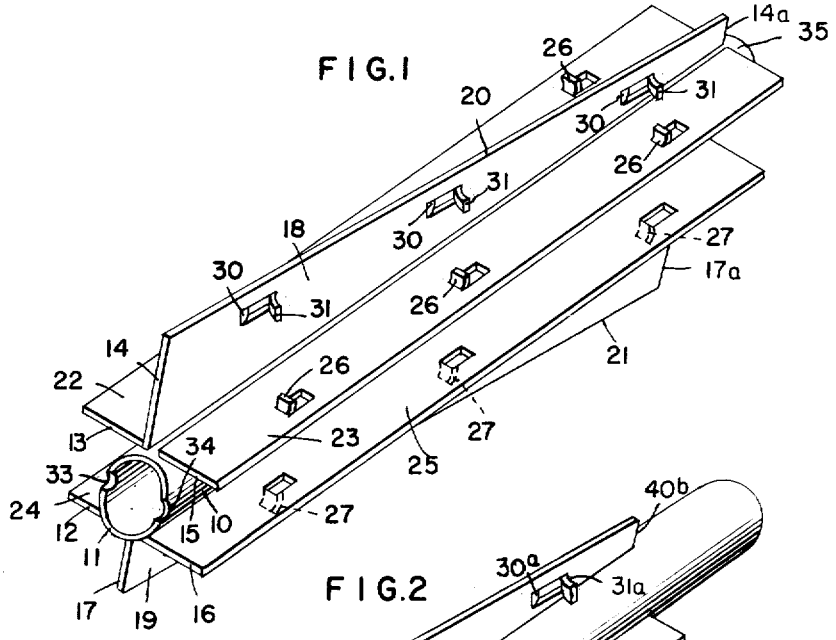
FIG. 1 is a perspective view of an insert for a tuyere block constructed in accordance with this invention.
Figure 2:
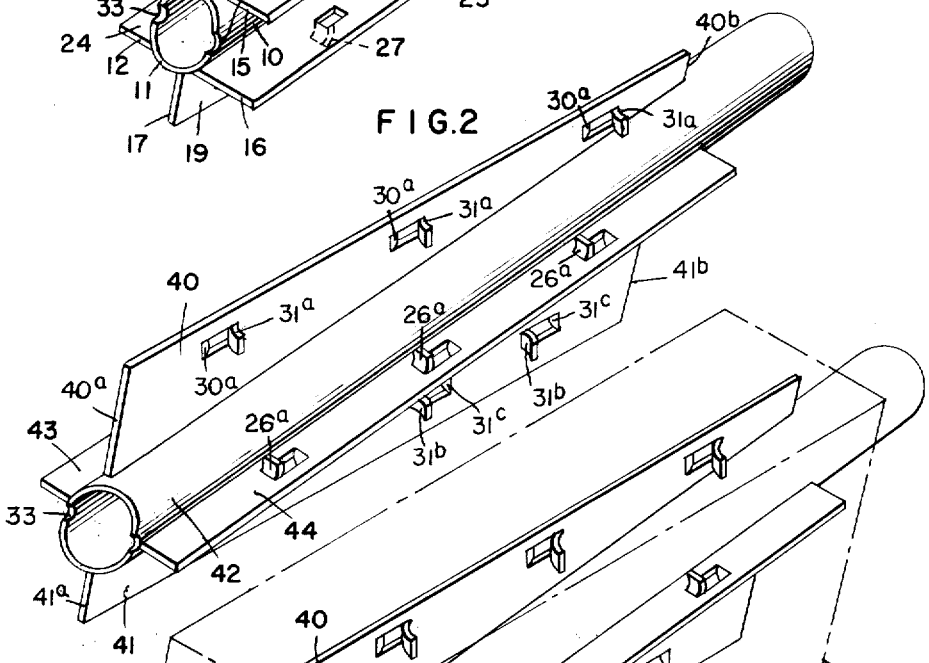
FIG. 2 is a view similar to FIG. 1 but showing a modified insert construction.

In the modification as shown in FIG. 2 there is a structure somewhat similar to that previously described in conjunction with FIG. 1, however, instead of providing the multi-finned construction there is shown in this particular form a pair of vertically disposed fin members 40 and 41 and a pair of horizontally disposed fin members 43 and 44, all of these fin members extending axially along the length of tuyere pipe 42 and radially therefrom. Preferably these fin members are also secured to the pipe 42 by welding, however, it can be understood that the fin members can be formed as an integral structure of the pipe 42. As in FIG. 1 the vertically extending fin members 40 and 41 are substantially of a trapezoidal shape with the end face or edge 40a of the fin member 40 being greater in length than the end edge 40b while the end face 41a of the fin member 41 is substantially less in length than the end edge 41b. Each of the fin members, similar to FIG. 1, are provided with outwardly struck tongues 26a, 30a, 31a, 31b and 31c for properly securing and locking the insert in position in the block substantially as described in conjunction with FIG. 1.

Figure 3:
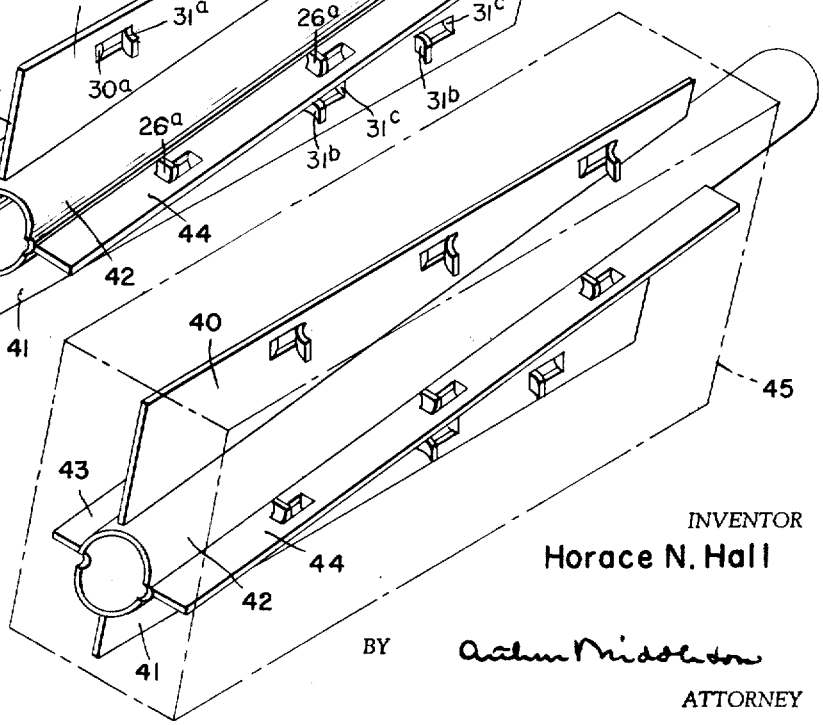
FIG. 3 is a view similar to FIG. 1 but showing the tuyere block in phantom outline.

FIG. 3 illustrates the modification of FIG. 2 in relation to the block itself as shown in phantom lines in that figure and as indicated by the reference character 45. Because of the trapezoidal shape of the upper and lower fins 40 and 41 the lead-in pipe 42 is disposed at an askew angle through the brick, as is conventional in tuyere constructions. It will be noted that the reinforcing fins 40 and 41 reinforce the entire height of the block in the vertical direction while the reinforcing fins 43 and 44 reinforce the block in a horizontal or radial direction while at the same time allowing the pipe to be disposed within the block in an angulated position.

Figure 4:
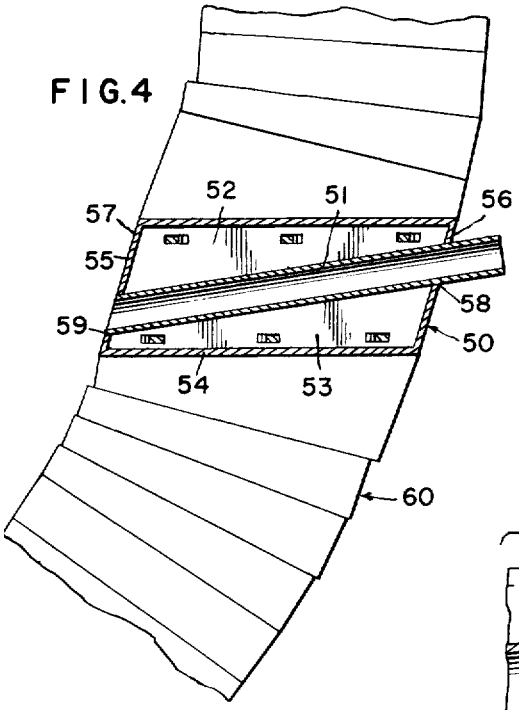
FIG 4 is a vertical sectional view taken through a glass furnace wall showing the relative position of the tuyere block.
Figure 6:
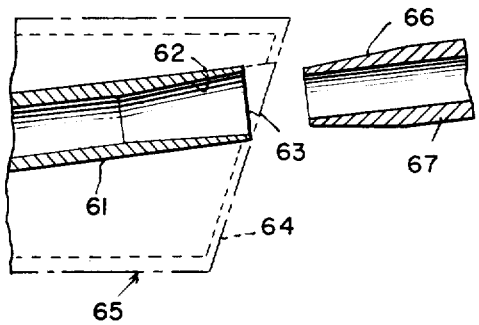
FIGS. 6, 7 and 8 show various modifications of lead-in pipe construction in the manner of coupling the air or gas inlet thereto.
Figure 7:
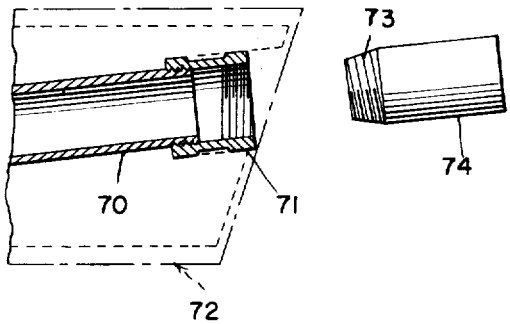

Referring at this time more particularly to FIG. 4 a completed tuyere block in accordance with the present invention is indicated therein generally by the reference character 50 and is shown in section in this figure, the lead-in pipe being designated by the reference character 51, the upper fin by reference character 52 and the lower fin by the reference character 53, reference character 54 designating the block material proper within which the insert is completely embedded. It will be noted that the opposite ends 55 and 56 of the fins are somewhat inset from the opposite end faces 57 and 58 of the brick so that they are not directly exposed exteriorly thereof and not subjected to the corrosion effects of the blast furnace operation. For this purpose, of course, the end face 59 of the lead-in pipe extends outwardly relative to the end edges 55 to permit of this inset relationship of the latter. The wall within which the tuyere block 50 is disposed is indicated generally by the reference character 60. In FIG. 6 there is disclosed one means of attaching the source of air or gas to the tuyere pipe. As shown the lead-in pipe 61 is provided with an internal taper 62 at one end and the end face 63 of the tuyere pipe is slightly inset relative to the corresponding end face 64 of the brick 65. The taper 62 is adapted to receive a correspondingly tapered end portion 66 of the air inlet pipe 67 so that the connection there between may be readily made. A further modification of the manner in which the lead-in pipe is coupled to the air supply pipe is illustrated in FIG. 7 wherein the lead-in pipe 70 is provided with a nipple 71 embedded within the brick 72 and adapted to receive the threaded end portion 73 of the supply pipe 74.

Figure 8:
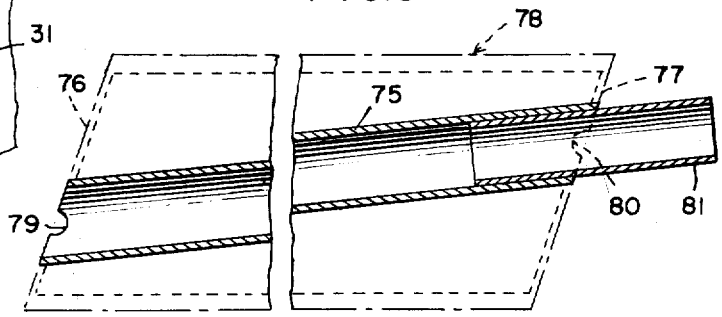

Likewise it has been found that lead-in pipe 75 as shown in FIG. 8 may simply extend flush between the opposite end faces 76 and 77 of the brick 78 in which case both of its ends are provided with the aligned notches 79 and 80 and the connection between the lead-in pipe or tuyere pipe 75 and the air supply pipe 81 is made simply slip-fitting the supply 81 into the tuyere pipe as shown. As indicated in phantom outline the tuyere pipe 75 as shown in FIG. 8 may likewise include reinforcing fins such as shown in FIG. 2.

Figure 9:
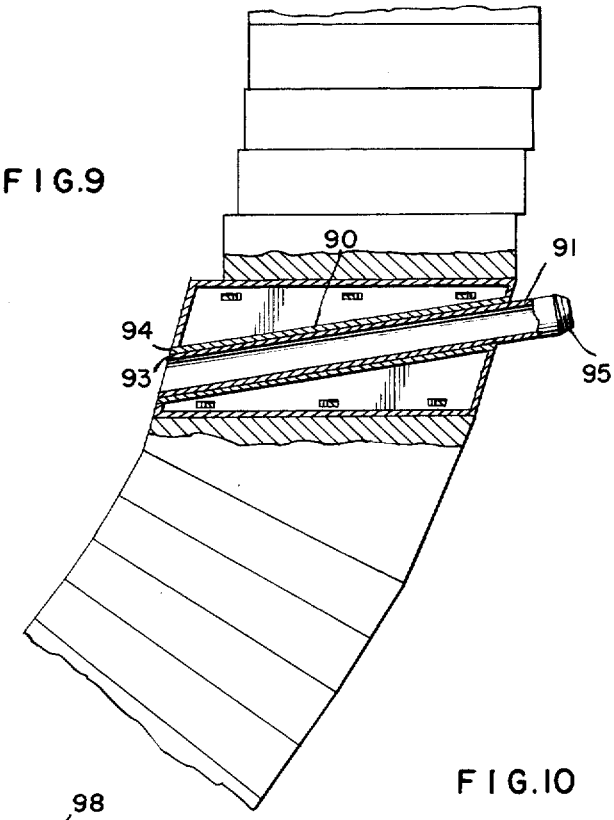
FIG. 9 is a view similar to FIG. 4 but illustrating a modified form of tuyere brick construction.
Figure 10:
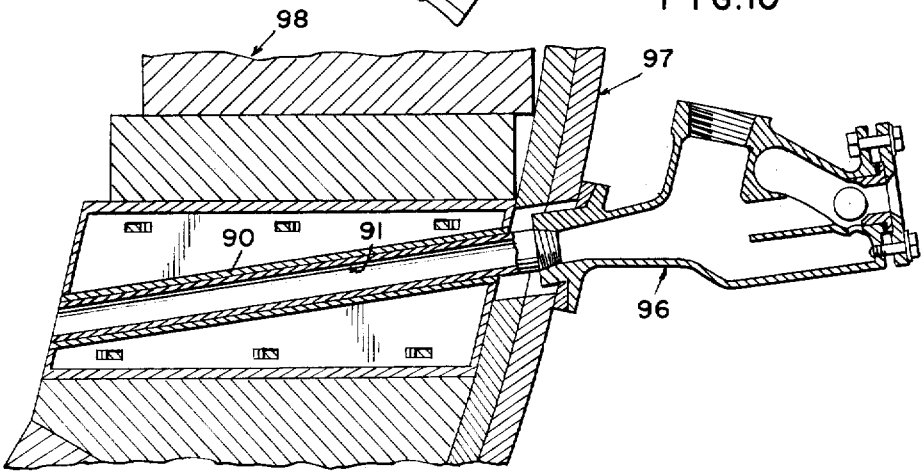
FIG. 10 is an enlarged view showing a portion of the assembly as shown in FIG. 9 and illustrating the air connection as made through the tuyere block.

A further modification which has been found to be of extreme practical value is illustrated in FIGS. 9 and 10. In this case the lead-in pipe 90 is identical to that shown in FIG. 8, that is it extends between the opposite end faces of the block and the end faces are substantially flush with the end face of the block surface. A separate connecting pipe 91 is slip-fitted inside the lead-in tuyere pipe 90 so that the two ends 93 and 94 thereof are substantially flush and having the opposite projecting end portion 95 of the connecting pipe threaded so that it can be attached to the coupling 96 shown in FIG. 10 for suitable connection to the conventional air or gas inlet mechanism. Here again the tuyere pipe 90 may be provided with vertically extending fin members along with horizontally extending fin members substantially as shown, the said fin members being of a type shown in FIG. 2 or in FIG. 1.

Referring now to FIG. 10 the outer wall of the furnace is indicated generally by the reference character 97, and the brick lining thereof within which the tuyere is located is indicated generally by the reference character 98. It will be seen that when the brick is new, the connecting pipe 91 may be inserted into the lead-in pipe after the coupling 96 is attached thereto but after having been in service, the connecting pipe and the lead-in pipe will naturally be fused together at their inner end and will conjointly give a double thickness thereby preventing the burning out of the pipe and the brick and permitting the same to remain in service longer. At the same time the fins reinforce and rigidify the brick and the lead-in pipe acts as a liner for the opening through the brick. In conclusion there is provided by the present invention a combined tuyere block incorporating a tuyere inlet pipe associated therewith in integral relationship and substantially embedded therein with the said tuyere pipe including reinforcing fin members secured thereto either by welding or by some other suitable means and wherein the reinforcing elements or fins are disposed in ideal relationship to the pipe as distinguished from the haphazard way of reinforcing tuyere blocks and bricks in prior usage. By associating the tuyere pipe as an integral part of the tuyere block it is readily seen that the disadvantages afforded by prior sealing methods are completely eliminated since the integral formation of the tuyere block and tuyere pipe provides a perfect seal without the need for extraneous sealing.

While the fin members are shown in substantially trapezoidal shape it is understood that the shape of the fins may be varied dependent upon the angle at which it is desired to dispose the pipe within the block.

I claim:

1. A molded [fired] tuyere block of a suitable refractory material and for use in a furnace wall, a combined unitary hollow tuyere pipe with a plurality of outwardly extending block reinforcing flanges thereon molded within the block, the block having opposed top and bottom walls, side walls and end walls with all of said walls having exterior surfaces, the said pipe being of considerably less diameter than the over-all cross-sectional dimensions of the block and of such length so that respective open ends thereof are closely adjacent to, exposed and accessible from the exterior surfaces of each end wall of the block, the pipe having the plurality of outwardly extending block reinforcing fins fixed thereon, the fins having extreme respective end portions thereof that are close to, but terminate adjacent the exterior surfaces of respective adjacent end walls, the fins also having respective side edges that are close to, but terminate adjacent the exterior surfaces of respective adjacent top, bottom and side walls, one accessible end portion of the pipe affording connection therewith of means for supplying gas thereat for passage through the pipe molded in the block, and the material of the block being in contacting sealing relationship with the pipe and fins.

2. A tuyere block as defined in and by claim 1 wherein the tuyere pipe molded in the block is inclined horizontally relative to opposite top and bottom walls and throughout substantially the length of the block.

3. The tuyere block as defined in and by claim 1 wherein there are at least two fins with side edges in close adjacency to the exterior of the top and bottom walls, one of the fins decreasing in width from adjacent one end wall to the other end wall, and the other of said fins increasing in width from adjacent the said other end wall to said one end wall.

4. A tuyere block as defined in and by claim 1 wherein at least two fins lie in a common plane passing diametrically through the said pipe and at least two other fins lie in a common plane perpendicular to the first plane and passing diametrically through the tuyere pipe.

5. A tuyere block as defined in and by claim 1 and wherein there are at least two fins each with bottom edges thereof fixed to the pipe substantially throughout its length and the fins being in a common plane passing diametrically through said pipe, and at least two other fins each extending right angularly from adjacent the bottom edge of at least one of said diametrically disposed fins.

6. The tuyere block as defined in and by claim 1 wherein one end of the tuyere pipe extends beyond the outer surface of one end wall of the block.

References Cited in the file of this patent or the original patent

UNITED STATES PATENTS

| | | |
|---|---|---|
| 712,053 | Field | Oct. 28, 1902 |
| 1,205,568 | Ross | Nov. 21, 1916 |
| 1,478,439 | Kirby | Dec. 25, 1923 |
| 1,524,146 | Murray | Jan. 27, 1925 |
| 2,370,174 | Kinninger | Feb. 27, 1945 |
| 2,480,394 | Cavers et al. | Aug. 30, 1949 |
| 2,829,879 | Kosmider et al. | Apr. 8, 1958 |

FOREIGN PATENTS

| | | |
|---|---|---|
| 22,377 | Australia | Sept. 1, 1930 |
| 802,538 | Germany | Feb. 15, 1951 |